United States Patent
Casimiro et al.

(10) Patent No.: US 9,540,803 B2
(45) Date of Patent: Jan. 10, 2017

(54) WALL AND CEILING COATING COMPOSITION HAVING HEAT INSULATION PROPERTIES

(71) Applicant: BOSTIK SA, La Plaine St Denis (FR)

(72) Inventors: Jessie Casimiro, Brie Comte Robert (FR); Eric Verscheure, Vernou la Celle sur Seine (FR)

(73) Assignee: BOSTIK SA, La Plaine St Denis (FR)

( * ) Notice: Subject to any disclaimer, the term of this patent is extended or adjusted under 35 U.S.C. 154(b) by 0 days.

(21) Appl. No.: 14/572,387

(22) Filed: Dec. 16, 2014

(65) Prior Publication Data

US 2015/0176267 A1 Jun. 25, 2015

(30) Foreign Application Priority Data

Dec. 19, 2013 (FR) ..................................... 13 62984

(51) Int. Cl.

| | | |
|---|---|---|
| C09D 5/00 | (2006.01) | |
| B05D 1/28 | (2006.01) | |
| E04B 1/76 | (2006.01) | |
| C08K 7/26 | (2006.01) | |
| C08K 5/05 | (2006.01) | |
| C04B 26/04 | (2006.01) | |
| C04B 26/06 | (2006.01) | |
| C04B 26/16 | (2006.01) | |
| C09D 5/02 | (2006.01) | |
| C09D 5/34 | (2006.01) | |
| C09D 7/12 | (2006.01) | |
| C08K 3/00 | (2006.01) | |
| C08K 7/22 | (2006.01) | |
| C04B 103/00 | (2006.01) | |
| C04B 111/00 | (2006.01) | |
| C04B 111/28 | (2006.01) | |
| C08L 33/26 | (2006.01) | |

(52) U.S. Cl.
CPC . *E04B 1/76* (2013.01); *B05D 1/28* (2013.01); *C04B 26/04* (2013.01); *C04B 26/06* (2013.01); *C04B 26/16* (2013.01); *C09D 5/00* (2013.01); *C09D 5/024* (2013.01); *C09D 5/34* (2013.01); *C09D 7/1291* (2013.01); *C04B 2103/0065* (2013.01); *C04B 2111/00482* (2013.01); *C04B 2111/28* (2013.01); *C04B 2201/32* (2013.01); *C08K 3/0033* (2013.01); *C08K 5/05* (2013.01); *C08K 7/22* (2013.01); *C08K 7/26* (2013.01); *C08L 33/26* (2013.01); *C09D 7/1283* (2013.01); *Y10T 428/249972* (2015.04); *Y10T 428/249974* (2015.04)

(58) Field of Classification Search
CPC .......... C04B 26/04; C04B 26/06; C04B 26/16; C09D 5/34; E04B 1/76; C08K 7/26
USPC ...................... 525/62; 427/428.01; 428/313.5
See application file for complete search history.

(56) References Cited

U.S. PATENT DOCUMENTS

| | | | |
|---|---|---|---|
| 6,277,190 B1 * | 8/2001 | Schulte | C04B 20/1022 106/719 |
| 7,754,788 B2 * | 7/2010 | Brox | C04B 26/04 106/400 |
| 2005/0126441 A1 * | 6/2005 | Skelhorn | C04B 26/02 106/409 |
| 2005/0271882 A1 | 12/2005 | Walther et al. | |
| 2008/0281028 A1 | 11/2008 | Brox et al. | |
| 2011/0311801 A1 * | 12/2011 | Wheeler | C09D 7/02 428/313.5 |
| 2012/0126164 A1 | 5/2012 | Cooray | |

FOREIGN PATENT DOCUMENTS

| | | |
|---|---|---|
| DE | 102005040091 A1 | 3/2007 |
| EP | 2289862 A1 | 3/2011 |
| WO | 01/77242 A2 | 10/2001 |

OTHER PUBLICATIONS

"Paint Roller Techniques and Tips" by The Family Handyman Magazine, Apr. 2002.*
Search Report and Written Opinion from priority Patent Application No. FR 13/62984 dated Oct. 9, 2014.

* cited by examiner

*Primary Examiner* — Vu A Nguyen
(74) *Attorney, Agent, or Firm* — Millen, White, Zelano and Branigan, P.C.

(57) ABSTRACT

A coating composition of:
from 4 to 17 wt % of hollow microspheres having a thermal conductivity (designated lambda) below 0.1 $W \cdot m^{-1} \cdot K^{-1}$,
from 0.05 to 1 wt % of at least one linear alcohol whose hydrocarbon chain comprises at least 8 carbon atoms,
from 5 to 25 wt % of at least one bonding agent selected from water-dispersible or water-soluble polymers, comprising a glass transition temperature (Tg) less than or equal to 65° C.,
from 25 to 50 wt % of a non-hydraulic binder that is mineral and metallic fillers: having an average particle size in the range from 5 to 100 μm,
from 0.1 to 1 wt % of at least one thickener,
water,
Use thereof and the applications thereof as smoothing and/or heat-insulating coating for walls and ceilings.

18 Claims, No Drawings

WALL AND CEILING COATING COMPOSITION HAVING HEAT INSULATION PROPERTIES

In the field of construction and building, heat insulation denotes all the techniques employed for limiting the heat transfers between the interior and the exterior, which are at different temperatures. It may be a question of limiting the losses of heat from the interior to the exterior or, conversely, limiting the transfer of heat from the exterior to the interior. In the area of housing, these heat transfers may take place through various walls separating the habitable space from the external environment: roofs and roofing, walls, ceilings, glazing and windows, floors. For combating these heat transfers, solutions exist that are appropriate to each of the situations mentioned above.

Walls and ceilings represent large surfaces through which heat exchanges will occur. Thermal insulation of these parts of the building can thus improve the thermal performance of the building considerably and reduce the energy costs of extra heating or extra air conditioning associated with poor insulation.

There are three broad families of known methods of heat insulation of walls and/or ceilings:
- heat insulation in the wall thickness, by incorporating insulating elements within the wall (insulating panels or blocks, lining blocks, insulating foam) generally at the time of construction;
- heat insulation on the inside, i.e. insulation of the inner surface of the wall, and
- heat insulation on the outside, i.e. insulation of the exterior facade of the wall, which is exposed directly to the climatic conditions (sun, wind, bad weather); it being possible for these last two techniques to be carried out on an existing wall, in contrast to the first technique mentioned.

For each of these methods, there are corresponding appropriate means for heat insulation, which are rarely interchangeable. In particular, when we wish to provide thermal insulation for an existing wall, the insulating devices suitable for interior insulation are not generally suitable for exterior insulation, which must withstand the exterior atmospheric factors. Moreover, insulating devices suitable for exterior insulation will not generally be suitable for interior insulation, as they are bulky or thick (5 to 8 centimetres) and have a rough appearance and require a finishing step.

In the context of the present application, we were interested in heat insulation of walls and ceilings, within a construction space or habitation. Heat insulation on the inside offers the advantage of not altering the external appearance of the space to be insulated, in contrast to heat insulation on the outside. The work may be undertaken without special administrative permission.

Most of the currently existing solutions for providing heat insulation of a wall or ceiling from the inside consist of assembling, against the latter, insulating panels, double partitions or a false ceiling (based on foamed polystyrene, glass wool, rock wool, etc.) or gluing a liner against the surface to be insulated, providing an air gap or an interstitial surface filled with some other insulator. However, these insulating systems are relatively thick and greatly reduce the volume and area of the habitable space. Moreover, fitting of these partitions is complicated and users are often reluctant to undertake this heavy work themselves, which notably involves cutting the insulating materials to size, preparing the walls, which must moreover be moisture-free, and fitting seals between the insulating materials. When these partitions are badly fitted, assembled, fixed or dimensioned, gaps may appear between the partitions and generate energy leaks of variable magnitude or even infiltrations of water due to condensation of the humidity of the air behind the insulating partitions. In certain cases this may eventually promote the appearance of fungi and moulds.

Moreover, when it is desired to replace or improve the heat insulation of a double wall of an insulating partition without substantial loss of space, it is necessary to remove the existing liner, repair the supporting wall if necessary, and fit a new insulation system that will give better performance, for an equivalent thickness.

Accordingly, all these tasks of fitting insulation and renovation/restoration are complicated and are not within the capability of just any user. On the contrary, it is recommended to employ professionals in the area in question to avoid the creation of thermal bridges, i.e. points or linear zones where the insulating barrier is interrupted.

The use of liquid or pasty coating compositions of the two-component type (also called finishing coating), obtained by extemporaneous mixing of a solid component and a liquid component in a weight ratio of liquid to solid in the range from 0.8 to 1, to provide thermal and sound insulation for a wall from the inside or from the outside, is known from patent application EP 0 281 476. The solid component comprises from 20 to 60 wt % of a hydraulic binder selected from the group consisting of plaster, cement and swelling calcium bentonite, from 10 to 40 wt % of a product selected from the group consisting of sawdust and ground metallurgical slag, and from 2 to 10 wt % of micronized natural mica. The liquid component comprises, dispersed in water, a resin of an acrylic copolymer at basic pH in an amount representing from 30 to 50 wt % of the component, and a plasticizer. After mixing the solid component and the liquid component in a particular weight ratio, the composition resulting from said mixing is sprayed onto the surface to be insulated using a spraying machine.

Although application of these compositions seems simpler compared to the conventional solid heat insulation systems described above, it still has many drawbacks. In fact, these compositions cannot be stored in the form of ready-to-use compositions as they cake and harden rapidly after mixing the liquid and solid components (in less than about 3 hours). Application of this type of coating therefore requires at least two steps to be carried out: one consisting of preparing the composition and the other consisting of applying the coating. Moreover, use of these compositions presents the drawback of requiring a spraying machine and special tools for weighing, mixing the solid and liquid components, and applying the composition obtained. This may be particularly difficult when large volumes of products are involved. Moreover, the user is not immune to errors in weighing or mixing during preparation of the composition, which may lead to a heterogeneous mixture or premature caking of the mixture, and therefore non-uniform application of the composition on the substrate, generating thermal bridges. Moreover, the covering obtained after hardening of the coating layer on the substrate is still relatively thick (about 5 cm) and has a roughcast appearance, which is both unsightly and unsuitable for surface application of a decorative finishing wall coating, in particular a decorative wall covering that is thin and/or fragile such as wallpaper. The latter in fact risks having little or no adherence to the raw surface of the hardened coating and of quickly peeling away or of being torn on contact with the surface asperities of the coating. The insulating coating thus obtained is therefore impractical for use as a base coat for finishing.

Paint compositions having heat insulation properties, used alone or in combination with a priming coat allowing adherence of the paint composition on the surface to be coated, are also known from application US 2005/0126441. These paint compositions comprise pigments that reflect infrared radiation and/or hollow glass microspheres.

However, these compositions lead to coatings of insufficient thickness (at most 300 μm) to allow good insulation of walls. In fact, these coatings offer little or no performance if they are applied as interior coating or are used as base coat for a non-insulating material. Moreover, when the wall or ceiling to be insulated is damaged, for example by the presence of holes or cracks of up to 3 mm or even 1 cm in depth, these compositions do not allow continuous coverage of the damaged surface of the wall or ceiling, leaving these defects visible. The result obtained is therefore very unsatisfactory aesthetically and cannot provide continuous heat insulation on the entire surface of the wall or ceiling. Moreover, these compositions present a risk of flaking or cracking, and therefore of creating thermal bridges, further impairing the thermal performance of the insulating coating. Blisters, weakening the insulation, may also appear in time on the surface of the coating, if moisture is present in the brickwork, resulting in poor adhesion of the coating on the substrate surface.

Thus, these existing heat insulation systems are not completely satisfactory and there is a need for a heat insulation system that allows some or all of the drawbacks of the prior art to be remedied.

In particular, there is a need to provide a heat insulation system that can be applied easily and quickly on the inner surface of a wall or ceiling, and is compact compared to the existing systems.

In particular, there is a need to formulate a heat insulation system for interior walls and ceilings that can be applied uniformly on a surface to be insulated, and has an aesthetically acceptable appearance, suitable for applying a decorative finishing wall coating thereon, and in particular a decorative wall covering that is thin and/or fragile, such as wallpaper.

In particular, there is a need to find a heat insulation system allowing efficient insulation both of new surfaces and those with slight or moderate damage.

In order to respond to these needs, and in particular in order to make it possible for any user, even with little experience, to fit and improve a heat insulation system on the inside, without substantial loss of space, a fluid (liquid or pasty) heat insulation system for walls has now been elaborated, as defined below.

Thus, the invention relates firstly to a coating composition comprising:
from 4 to 17 wt % of hollow microspheres (designated a)) having a thermal conductivity (designated lambda) below 0.1 W·m$^{-1}$·K$^{-1}$,
from 0.05 to 1 wt % of at least one linear alcohol (designated b)) whose hydrocarbon chain comprises at least 8 carbon atoms,
from 5 to 25 wt % of at least one bonding agent (designated c)) selected from water-dispersible or water-soluble polymers having a glass transition temperature (Tg) less than or equal to 65° C.,
from 25 to 50 wt % of a non-hydraulic binder (designated d)) selected from the following mineral and metallic fillers: carbonate of an alkaline-earth metal, alumina, silica, silicate of a metal selected from aluminium, the alkali metals and the alkaline-earth metals, and mixture thereof, said fillers having an average particle size in the range from 5 to 100 μm,
from 0.1 to 1 wt % of at least one thickener (designated e)),
water (designated f)),
the percentages by weight being expressed in wt % of dry matter relative to the total weight of the coating composition.

In contrast to the existing heat insulation systems, the coating composition according to the invention is easy and quick to apply, even for an inexperienced user. In particular, the coating composition according to the invention can be applied uniformly by roller, without running, and dries quickly.

The coating composition according to the invention is a ready-to-use composition. It does not require special preparation before use, and is sufficiently stable in storage, as it is not formulated in the form of a two-component composition or premix.

In contrast to two-component compositions that cake during contact of the solid phase with the liquid phase, the coating composition according to the invention is a single-component composition which hardens by evaporation of the water contained in the composition. Once hardened and dried, the composition according to the invention can form a rigid material, and notably a coating, possessing heat insulation properties suitable for providing good insulation of walls and ceilings from the inside.

The coating thus obtained has an acceptable thickness with respect to the desired heat insulation performance and minimum space occupied. In particular, the coating advantageously has a thermal conductivity below 0.07 W·m$^{-1}$·K$^{-1}$ (watt per metre per kelvin), preferably below 0.065 W·m$^{-1}$·K$^{-1}$ and a thickness in the range from 0.5 to 5 millimetres, preferably in the range from 0.5 to 3 millimetres.

Advantageously, the coating composition according to the invention may be applied with a thickness of up to three millimetres without problems of adherence to the substrate or cracking, once dried. It was found, in particular, that the use of from 0.05 to 1 wt % of a fatty alcohol (whose hydrocarbon chain comprises at least 8 carbon atoms) in the coating composition according to the invention allowed a crack-free coating to be obtained.

Moreover, the coating composition according to the invention may be used as a smoothing coating for ensuring flatness of a surface of a substrate with small defects (asperities and/or holes and cracks that may be up to 1 cm in depth and preferably up to 3 mm in depth). In particular, it makes it possible to smooth the walls and the ceilings and therefore restore and/or prepare them for applying a decorative surface wall coating such as wallpaper, tapestry, paint, varnish.

The coating thus obtained has a uniform, flat surface relative to the face of said substrate and may be covered with a decorative wall covering that is thin and/or fragile such as wallpaper.

In particular, the coating obtained can reduce or eliminate the sensation of a cold wall when we touch the wall, which is generally associated with inadequate heat insulation of the wall.

Moreover, the insulating coating according to the invention may be covered with a decorative surface wall coating without loss or notable decrease of its insulating properties.

Other aims and features or advantages of the present invention will become clearer on reading the description and the examples.

In the present application, unless stated otherwise:
amounts expressed in the form of a percentage correspond to percentages weight/weight. In particular, the amounts relating to the ingredients designated a), b), c), d) and e) as described above and to the additives optionally present in the composition according to the invention are expressed in percentage by weight of dry matter relative to the total weight of the coating composition according to the invention;
the thermal conductivity is measured at 20° C., at atmospheric pressure and at 50% relative humidity. The thermal conductivity may be measured using a conductivity meter.
the average particle size (hollow microsphere or filler) is measured for a granulometric distribution by volume, corresponding to 50 vol % of the sample of particles analysed. When the particles are spherical, the average particle size corresponds to the median diameter (D50 or Dv50), which corresponds to the diameter such that 50% of the particles by volume have a size less than said diameter. In the present application, this value is expressed in micrometres and is determined according to standard NF ISO 13320-1 (1999) by laser diffraction on apparatus of the MALVERN type.
sphere or spherical characterizes particles (hollow microsphere or filler) having a shape ratio close to 1, in the range from 0.5 to 1.5 for example, such as particles of oblong, ovoid, or ellipsoidal shape, and preferably equal to 1, i.e. having a spherical shape. This shape ratio is defined as the ratio of the maximum distance between two points of the surface of the particle, in a principal direction, to the minimum distance between two points of the surface of the particle, in a direction approximately perpendicular to the principal direction.

The coating composition according to the invention comprises from 4 to 17 wt % of hollow microspheres having a thermal conductivity below $0.1 \text{ W}\cdot\text{m}^{-1}\cdot\text{K}^{-1}$, preferably in the range from 0.01 to 0.065 $\text{W}\cdot\text{m}^{-1}\cdot\text{K}^{-1}$. Below this concentration range, the coating obtained has inadequate heat insulation properties (i.e. a lambda value above 0.1 W/(m·K)). Above such a concentration range, the composition is difficult to mix and cannot be applied by roller.

Preferably, the coating composition according to the invention comprises from 7 to 17 wt % of hollow microspheres.

The hollow microspheres used according to the invention may be selected from any hollow microspheres consisting of glass or polymer, and possessing a thermal conductivity below $0.1 \text{ W}\cdot\text{m}^{-1}\cdot\text{K}^{-1}$, preferably in the range from 0.01 to 0.065 $\text{W}\cdot\text{m}^{-1}\cdot\text{K}^{-1}$.

The thermal conductivity of the hollow microspheres used according to the invention may be measured in the usual way, at 21° C. under 1 bar, notably according to standard EN NF 12664.

The hollow microspheres used according to the invention preferably have a real density in the range from 0.05 to 0.5 g/cm$^3$, preferably from 0.1 to 0.3 g/cm$^3$.

The real density of the hollow microspheres may be measured conventionally, for example using an air pycnometer.

In particular, the hollow microspheres used according to the invention are preferably dispersible in water.

Advantageously, the hollow microspheres used according to the invention are non-porous. This is reflected by the fact that they do not absorb liquids, such as the water present in the coating composition according to the invention.

The hollow microspheres used according to the invention preferably comprise an inert gas or an inert gas mixture such as air, at a gas pressure in the range from $0.3\times10^5$ to $7\times10^5$ Pa at 23° C., said gas(es) having a thermal conductivity less than or equal to that of air. This gas (these gases) which is (or are) generally trapped during the process of manufacture of the hollow microspheres, is (or are) therefore at least as thermally insulating as air. Preferably, the hollow microspheres used according to the invention may comprise a mixture of sulphur dioxide and dioxygen in a molar ratio 2:1.

According to a preferred embodiment according to the invention, the hollow microspheres used according to the invention preferably have a single internal cavity. In this case they are called monocellular hollow microspheres in contrast to the multicellular hollow microspheres such as perlite.

According to this preferred embodiment according to the invention, the hollow microspheres comprise in their internal cavity a gas or inert gas mixture as mentioned above, notably a mixture of sulphur dioxide and dioxygen in a molar ratio 2:1.

According to this preferred embodiment according to the invention, the hollow microspheres used according to the invention preferably have an external wall, delimiting the interior of the internal cavity and the outside surface of the microsphere, of roughly uniform thickness and sufficient to withstand the impacts connected with handling of these compounds during preparation of the composition according to the invention, and ensuring hermeticity for the gas contained in the microsphere.

Among the hollow microspheres usable according to the invention, it is preferable to use those having an average particle size (D50) in the range from 0.10 to 100 μm, and more preferably in the range from 25 to 70 μm.

As examples of hollow glass microspheres that are usable, we may mention:
those of sodium and calcium borosilicate, such microspheres may be of float glass and can have undergone a surface treatment based on epoxysilane or chromium chloride methacrylate. Such compounds predominantly comprise silica, boron oxide, sodium and calcium salts generally introduced during manufacture in the form of CaO and Na$_2$O;
those of aluminosilicate. Such compounds predominantly comprise silica and aluminium oxide (alumina Al$_2$O$_3$).

It is preferable to use hollow microspheres of sodium and calcium borosilicate.

Hollow glass microspheres of this kind are sold under series SCOTCHLITE®K and S by the company Kremer or under the name Glass Bubble (of series S and K or of the series of the float glass products) by the 3M company.

As examples of hollow polymer microspheres that are usable, we may mention those based on thermoplastic polymer, such as the vinylidene chloride/acrylonitrile microspheres. The latter are sold for example under the name "Expancel®" by the company Akzo Nobel.

Preferably, the hollow polymer microspheres are not expansible in the conditions of pressure and temperature in which they are used, for example at 1 bar for temperatures in the range from −30° C. to 50° C.

Among all these hollow glass or polymer microspheres that are usable, it is preferable to use:
those of sodium and calcium borosilicate,
those of aluminosilicate,
those of vinylidene chloride/acrylonitrile.

Among all these hollow glass or polymer microspheres that are usable, it is preferable to use more particularly those of glass and notably of glass, monocellular, non-porous, selected from:

- those of soda-lime borosilicate glass, with thermal conductivity equal to 0.076 W/(m·K), with real density in the range from 0.19 to 0.25 g/cm³ and median diameter D50 of 29 μm, such as that marketed under the name "Scotchlite® S22" by the 3M company;
- those of soda-lime borosilicate glass, with thermal conductivity equal to 0.046 W/(m·K), with real density in the range from 0.1 to 0.14 g/cm³ and median diameter D50 of 46 μm, such as that marketed under the name "Scotchlite® K1" by the 3M company;
- those of vinylidene chloride/acrylonitrile, with thermal conductivity equal to 0.049 W/(m·K), of the "Expancel®" series for example.

The hollow microspheres used according to the invention may be prepared by methods of manufacture that are well known.

The hollow glass microspheres may notably be prepared by a method as described in application WO 2011/084407, allowing control of the size, shape, density and strength of the hollow glass microspheres. In this method of manufacture, a glass composition is melted and then crushed and ground to obtain particles of suitable size for obtaining hollow microspheres of the desired size. The ground glass is then heated under vacuum in contact with a flame at a temperature above the softening point of the glass composition, generally above 1300° C., to form hollow glass microspheres. The hollow microspheres may be obtained using a blowing agent such as sulphur or sulphur dioxide, introduced into the ground glass before the latter comes in contact with the flame. They may also be obtained without an expanding agent using the method described above at a pressure preferably below 6.773 Pa. The amount of expanding agent used, the temperature of the flame and the heating time of the ground material may be adjusted in order to obtain hollow glass microspheres of the desired density.

The hollow polymer microspheres may notably be prepared by a method as described in application U.S. Pat. No. 3,615,972, in which the hollow microspheres are formed by polymerizing, with catalysis, an aqueous microdispersion of polymer having polymer droplets of uniform size comprising a blowing agent. The size of the polymer droplets may be adjusted by varying the stirring speed of the mixture, and may be stabilized using surfactant(s) and/or thickener(s) preventing coalescence of the droplets. Once polymerized, the microspheres obtained are filtered and dried and may undergo a step of expansion allowing increase in size of the microspheres and reduction of their wall thickness. In this step, the microspheres are heated to a temperature above the softening point of the polymer in order to cause expansion of the internal cavity of the microsphere until their final dimension is reached by evaporation of the blowing agent. The blowing gas then diffuses through the polymer shell and is replaced with air. The hollow microspheres may also be unexpanded when the polymer selected for preparing them is crosslinked or has a high molecular weight.

The coating composition according to the invention comprises from 0.05 to 1 wt %, preferably from 0.1 to 1 wt %, of at least one alcohol whose hydrocarbon chain comprises at least 8 carbon atoms, and preferably from 8 to 30 carbon atoms.

The alcohol or alcohols used in the composition according to the invention may be selected from the mono- or polyols, comprising a linear hydrocarbon chain.

Preferably, the alcohol used according to the invention is selected from:

- the linear fatty alcohols corresponding to the formula ROH, where R is a linear hydrocarbon chain, saturated or unsaturated, having from 8 to 30 carbon atoms. These alcohols, used in combination with the other ingredients of the composition of the invention, make it possible to obtain a coating that does not crack. Among the commercial products available that may be used, we may mention for example the product "Loxanol® 842 DP/3" sold by the company BASF and corresponding to an aqueous dispersion of linear fatty alcohol at 30 wt % of dry matter;
- the polymeric alcohols comprising a linear hydrocarbon chain, such as the vinyl polyols, having a Tg in the range from 75 to 95° C. These alcohols, used in combination with the other ingredients of the composition of the invention, make it possible to provide the coating with satisfactory hardness. Among the commercial products available that may be used, we may mention for example the product "Solvitose® 17S" sold by the company AVEBE, which corresponds to a partially hydrolysed polyvinyl alcohol having a Tg of about 85° C. in the form of powder;
- and mixture thereof.

More preferably, a mixture of linear fatty alcohol(s) of formula ROH is used, where R is a linear hydrocarbon chain, saturated or unsaturated, having from 8 to 30 carbon atoms and vinyl polyol(s), having a Tg in the range from 75 to 95° C.

The coating composition according to the invention comprises from 5 to 25 wt %, and preferably from 10 to 20 wt %, of at least one bonding agent selected from the water-dispersible or water-soluble polymers having a glass transition temperature less than or equal to 65° C., and preferably in the range from 5° C. at 65° C.

When the glass transition temperature of the polymer is in the range from 5 to 65° C., the coating obtained after drying of the composition has a satisfactory hardness. In particular, the coating does not deform after drying.

For Tg values above 65° C., the coating no longer has sufficient adherence relative to the substrate.

As examples of bonding agents that are usable, we may mention the copolymers of styrene and (meth)acrylic acid, the copolymers of styrene and ester of (meth)acrylic acid, the copolymers of styrene and (meth)acrylamide, wherein said copolymers may be silanized, the homopolymers and copolymers of butadiene such as polybutadiene and polybutadiene-styrene, the vinyl polymers such as polyvinyl chloride and polyvinyl acetate, the polyurethanes, and mixture thereof.

In particular, the monomers of (meth)acrylic acid or of ester of (meth)acrylic acid usable for preparing these bonding agents may be selected from:

- acrylic acid, methacrylic acid,
- alkyl (meth)acrylate whose alkyl moiety, linear or branched, cyclic or acyclic, comprises from 1 to 18 carbon atoms,
- allyl (meth)acrylate,
- alkyl ether (or alkyloxyalkyl) (meth)acrylate, in which each of the alkyl moieties, which may be identical or different, is linear or branched, and comprises from 1 to 18 carbon atoms,
- alkyl aryl ether (meth)acrylate (or aryloxyalkyl (meth)acrylate), whose alkyl moiety, linear or branched, comprises from 1 to 18 carbon atoms, and the aryl moiety is a phenyl group, hydroxyalkyl (meth)acrylate whose alkyl moiety, linear or branched, comprises from 1 to 18 carbon atoms, and is optionally interrupted by ester functions —C(=O)—O—, (meth)acrylate of polypropylene glycol or of polyethylene glycol.

More precisely, the monomers of (meth)acrylic acid or of ester of (meth)acrylic acid may be selected from methyl acrylate, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, stearyl acrylate, stearyl methacrylate, glycidyl methacrylate, hydroxyethyl acrylate, hydroxyethyl methacrylate, allyl methacrylate, cyclohexyl acrylate, cyclohexyl methacrylate, 2-ethoxyethyl-acrylate, 2-ethoxyethyl-methacrylate, isodecyl acrylate, isodecyl methacrylate, 2-methoxyethyl-acrylate, 2-ethoxyethyl-methacrylate, 2-(2-ethoxyethoxy)-ethylacrylate, 2-phenoxyethyl acrylate, 2-phenoxyethyl methacrylate, isobornyl acrylate, isobornyl methacrylate, caprolactone acrylate, caprolactone methacrylate, polypropylene glycol acrylate, polypropylene glycol methacrylate, polyethylene glycol acrylate, polyethylene glycol methacrylate, benzyl acrylate, benzyl methacrylate.

Preferably, the bonding agent or agents usable is (or are) selected from the copolymers of styrene and acrylic acid or the copolymers of styrene and of ester of acrylic acid.

More preferably, an aqueous emulsion of one of these copolymers is used, optionally silanized. Such products are sold for example under the name "Acronal® S813" (copolymer of styrene and of ester of acrylic acid, having a Tg of 28° C., available in the form of aqueous dispersion at 49 to 51 wt % of dry extract) or "Acronal® S533" (copolymer of styrene and of acrylic acid, having a Tg of 5° C., available in the form of aqueous dispersion at 51 to 53 wt % of dry extract) by the company BASF. Use of copolymers of styrene and silanized acrylic acid or the copolymers of styrene and silanized ester of acrylic acid makes it possible to obtain a coating possessing particularly satisfactory mechanical properties (water resistance for example).

The coating composition according to the invention comprises from 25 to 50 wt % of a non-hydraulic binder selected from the following mineral and metallic fillers: carbonate of an alkaline-earth metal, alumina, silica, silicate of a metal selected from aluminium, the alkali metals and the alkaline-earth metals, and mixture thereof, said fillers having an average particle size in the range from 5 to 100 μm. Preferably, the metallic or mineral filler or fillers are selected from the following fillers: calcium carbonate, magnesium carbonate, alumina, silica, aluminium silicate, magnesium silicate, sodium silicate, potassium silicate, mica, and mixture thereof.

The filler or fillers used in the composition of the invention may be in hydrated form or anhydrous.

These particles are different from the hollow glass or polymer microspheres with thermal conductivity below 0.1 $W \cdot m^{-1} \cdot K^{-1}$. In particular, these fillers are not hollow.

These fillers may be of various shapes, for example spherical.

Among the fillers usable according to the invention, preferably mineral fillers are used, and more preferably mineral fillers selected from calcium carbonate and silica.

According to a particular embodiment, preferably mineral fillers are used having a real density in the range from 2.5 to 3 $g/cm^3$.

These fillers are commercially available. As an example, we may mention calcium carbonate of average particle size D50 equal to about 22 μm, and with a real filler density of 2.7 $g/cm^3$, marketed under the name BEATITE® 30 by the company Onyx et Marbres Granules (OMG), silica with average size of about 35 μm, and with real filler density of 2.65 $g/cm^3$, marketed under the name Millicil C6 by the company Sifraco.

The coating composition according to the invention comprises from 0.1 to 1 wt % of at least one thickener.

It is possible to use any thickener usually employed in the conventional smoothing coating compositions.

The nature and the content of thickener(s) usable according to the invention are selected appropriately, in order to obtain the expected rheological properties.

Advantageously, the thickener(s) may be selected from clay, the polysaccharide thickeners such as thickeners based on starch and modified starch, cellulosic thickeners, and mixtures thereof, optionally in the presence of soda. Preferably, an amount of soda sufficient to obtain a basic pH is added to the composition according to the invention. This makes it possible to improve the rheological properties of the thickener and hence those of the coating composition.

Among the cellulosic thickeners that are usable, we may mention cellulose and alkylated and/or hydroxyalkylated derivatives thereof, whose alkyl moiety, identical or different, has from 1 to 4 carbon atoms, and preferably from 1 to 3 carbon atoms. As an example, we may mention methyl cellulose, methyl hydroxyethylcellulose, methyl hydroxypropylcellulose.

These thickeners are well known by a person skilled in the art and all are available commercially.

Among all these thickeners, it is preferable to use a mixture of thickeners comprising at least one thickener further possessing properties of water retention. As an example, we may mention a mixture of "Bentone® EW" corresponding to clay in the form of powder sold by the company ELEMENTIS Specialities, and "Addilose® 200 R" corresponding to a thickener and water retention agent based on modified starch, in the form of powder.

The coating composition according to the invention comprises water. The water content is adjusted as a function of the other ingredients present in the composition. Preferably, this content is in the range from 20 to 34 wt % of the total weight of the composition.

The coating composition according to the invention may further comprise at least one additive selected from filler dispersants, plasticizers, biocides and antifoaming agents. The coating composition according to the invention may comprise at least one homopolymer of acrylic acid acting as filler dispersant. When one or more additives is or are present in the composition, the total content of additives preferably does not exceed 2% and better still does not exceed 1 wt % relative to the total weight of the composition. Preferably, the coating composition according to the invention comprises from 0.5% to 2 wt % of additives.

According to a preferred embodiment, the coating composition according to the invention does not comprise hydraulic binder such as plaster, cement or calcium bentonite. The presence of a significant amount of hydraulic binder in the composition according to the invention risks causing rapid caking of the latter in contact with the water of the composition.

The coating composition according to the invention is prepared by simple mixing of the various ingredients of which it is constituted. It may then be stored dry, away from the air, in sealed packaging notably to prevent evaporation of the water contained in the coating composition. The composition may be stored like this for up to 18 months The present application further relates to a method of application of a coating composition according to the invention comprising the following steps:

(i) application of said composition in one or more successive layers on the surface of a substrate to be insulated using a roller and/or a smoothing tool, and then (ii) drying of said layer, and then (iii) optional application, on said hardened coating layer, of a layer of a non-insulating material, such as a layer of a decorative wall covering.

Steps (i) and then (ii) may be repeated one or more times before carrying out step (iii) if applicable.

The coating composition according to the invention may be applied by roller on the surface of a substrate to be insulated. Using a roller, the coating composition can be spread easily and uniformly on the entire surface to be insulated. Once spread, the surface of the composition may then be smoothed using a smoothing tool.

The time that passes between each application of the composition is preferably less than 30 minutes.

Step (i) may be followed by a step of smoothing using a smoothing tool when the surface of the composition applied at the end of step (i) is not or is not sufficiently smooth. The smoothing step may be carried out either by applying a new layer of coating composition using a smoothing tool, smoothing then taking place simultaneously with application of the composition, or by smoothing the surface of the composition applied at the end of step (i) without superposition of a new layer of coating composition, depending on the level of competence of the user in the area of the application of wall coatings.

Thus, according to a first variant of the invention, the method of application of a coating composition according to the invention comprises at least the following steps:

(i') application of a first layer of said composition on a surface of a substrate using a roller, to spread a uniform amount of the composition, then (ii') application of a second layer of said composition on said first layer deposited using a smoothing tool, to smooth the surface of the composition deposited, the time that passes between the first and second application of the composition being less than 30 minutes, then (iii') drying the coating composition, then (iv') optional application, on said hardened coating layer, of a layer of a non-insulating material, such as a layer of decorative wall covering.

According to this first variant, steps (i'), (ii'), and then (iii') may be repeated one or more times before carrying out step (iv') if applicable. Alternatively, steps (ii'), and then (iii') may be repeated one or more times before carrying out step (iv') if applicable.

According to a second variant of the invention, the method of application of a coating composition according to the invention comprises at least the following steps:

(i") application of a first layer of said composition on a surface of a substrate using a roller, to spread a uniform amount of the composition, then (ii") smoothing of the surface using a smoothing tool without adding additional material, then (iii") drying the coating composition, then (iv") optional application, on said hardened coating layer, of a layer of a non-insulating material, such as a layer of decorative wall covering.

According to this second variant, steps (i") and then (ii") may be repeated one or more times before carrying out step (iv") if applicable. This variant is particularly preferred as it can be carried out by any user, even with little experience in the field of application of wall coatings. In fact, these steps of the method are particularly easy to carry out and make it possible, even for an inexperienced user, to succeed in smoothing walls and ceilings. Use of a roller makes it possible to spread the composition quickly and uniformly, for overall correction of the surface defects of the substrate. Moreover, the coating composition has a hardening and drying time longer than 30 minutes, which allows the user time to correct any defects and irregularities left on the surface of the first coating layer.

According to a third variant of the invention, the method of application of a coating composition according to the invention comprises at least the following steps:

(i''') application of a layer of said composition on a surface of a substrate, preferably in a single pass, using a smoothing tool, then (ii''') drying the coating composition, then (iii''') optional application, on said hardened coating layer, of a layer of a non-insulating material, such as a layer of decorative wall covering.

According to this third variant, steps (i''') and then (ii''') may be repeated one or more times, before carrying out step (iii''') if applicable.

This method allows rapid and precise application of the composition according to the invention and represents a considerable time saving relative to the use of a composition of the two-component type.

For each of the methods mentioned above, the total amount of the composition applied on the entire surface of the substrate represents a substance in the range from 200 to 1000 g/m$^2$. With this substance it is possible to obtain a coating of the desired thickness as described below.

Among the rollers usable according to the invention, it is preferable to use honeycomb textured foam rollers, for example of polyamide or polyester. These rollers make it possible to spread the coating composition according to the invention more easily.

The coating composition according to the invention hardens during the drying step by evaporation of the water contained in the composition. In general, drying takes place in the air at 20° C. After 24 hours, the coating is completely dry and hard.

Once dried, the covering formed by the hardened coating composition advantageously has a thickness in the range from 0.5 to 5 millimetres, preferably from 0.5 to 3 mm, and better still from 1 to 2 mm.

Application of the methods described above thus advantageously makes it possible to obtain a substrate coated with a hardened coating layer with a thickness in the range from 0.5 to 5 millimetres, preferably from 0.5 to 3 mm, and better still from 1 to 2 mm.

The substrate intended to be covered with the coating composition according to the invention may consist of any material of construction, new or to be restored, with defects that may be up to 1 cm in depth. It may be plaster, plasterboards, mortar, concrete, wood, bricks, glazed earthenware tiles, leached and/or printed paints.

The non-insulating material for covering the coating layer may be of the same nature as the support or of a different nature. It may be a decorative wall covering, notably a thin and/or fragile decorative wall covering.

The decorative wall covering may be wallpaper, tapestry, paint, or varnish.

"Non-insulating" means that the material does not have a thermal conductivity below 0.1 W·m$^{-1}$·K$^{-1}$.

The present invention further relates to an insulating material and notably a substrate coated with a hardened coating layer with a thickness in the range from 0.5 to 5 millimetres, preferably from 0.5 to 3 mm, and better still from 1 to 2 mm, obtainable by the method as defined in one of the preceding paragraphs.

The present application also relates to the use of a coating composition according to the invention as smoothing and heat-insulating coating for walls and ceilings. These combined properties make it possible to insulate and restore old walls and ceilings easily and at the same time.

In particular, the coating composition according to the invention may be used for forming a heat-insulating interior wall covering, possessing a thermal conductivity below 0.07 $W \cdot m^{-1} \cdot K^{-1}$, and better still below 0.065 $W \cdot m^{-1} \cdot K^{-1}$.

The following examples are given purely for illustrating the invention and are not to be interpreted as limiting its scope.

EXAMPLES OF THE INVENTION

Coating compositions 1 to 5 according to the invention are produced by mixing the various ingredients shown in Table 1. Unless stated otherwise, the contents indicated in this table are expressed in wt % of dry ingredients relative to the total weight of the composition.

TABLE 1

|   | Compositions | 1 | 2 | 3 | 4 | 5 |
|---|---|---|---|---|---|---|
| a) | Hollow glass microspheres (Scotchlite ® S22, 0.076 $W \cdot m^{-1} \cdot K^{-1}$) | 14.3 | — | — | — | — |
|   | Hollow glass microspheres (Scotchlite ® K1, 0.047 $W \cdot m^{-1} \cdot K^{-1}$) | — | 15 | 7.5 | 10.0 | 12.0 |
| b) | $C_8$-$C_{30}$ linear fatty alcohol (Loxanol ®842 DP/3) | 0.1 | 0.1 | 0.1 | 0.1 | 0.1 |
|   | Polyvinyl alcohol (Solvitose ®17S) | 0.4 | 0.4 | 0.4 | 0.4 | 0.4 |
| c) | Styrene-butyl acrylate copolymer, Tg = 10° C. | 14.7 | 12.7 | 12.7 | 12.7 | 12.3 |
| d) | Calcium carbonate (Beatite ®30) | 34.7 | 36.4 | 43.9 | 41.4 | 29.1 |
| e) | Clay thickener (Bentone ®EW) | 0.2 | 0.3 | 0.3 | 0.3 | 0.3 |
|   | Polysaccharide thickener (Addilose 200R ®) | 0.3 | 0.3 | 0.3 | 0.3 | 0.3 |
|   | Soda lye | q.s. pH > 7 | q.s. pH > 7 | q.s. pH > 7 | q.s. pH > 7 | q.s. pH > 7 |
|   | Additives | 0.9* | 0.9* | 0.9* | 0.9* | 0.9* |
| f) | Water | q.s. 100 | q.s. 100 | q.s. 100 | q.s. 100 | q.s. 100 | q.s. signifies "sufficient amount for"
*amount expressed in wt % wet relative to the total weight of the composition These compositions may be stored for up to 18 months in the dry, in an air-tight and moisture-proof sealed container.

These compositions were applied easily and uniformly on various substrates (walls, ceilings) by roller and then with a smoothing tool, in a layer with a thickness varying from 0.5 to 3 mm. Once hardened, the covering layer has a smooth, defect-free surface.

Measurement of Thermal Conductivity

For each of examples 1 to 5, the thermal conductivity of the composition once dried is measured for a given thickness, at 23° C. at relative humidity of 50%. Measurement is performed using a measuring probe connected to a NEOTIM FP2C thermal conductivity meter. For this, the test composition is applied in two moulds of parallelepipedal shape made of Teflon with given length, width and thickness, so as to form test specimens 50 mm long, 70 mm wide and of thickness as shown in Table 2. After complete drying of the test specimen, and mould release, the measuring probe is then placed between the 2 test specimens of the composition. Then the two plates of the composition are pressed lightly against one another so that the measuring probe is sandwiched between these two plates.

The results of the measurements of thermal conductivity are expressed in watt per metre per kelvin and are presented in Table 2.

TABLE 2

| Characterization | 1 | 2 | 3 | 4 | 5 |
|---|---|---|---|---|---|
| Thickness (mm) | 0.9 | 2.1 | 1.3 | 1.9 | 1.9 |
| Thermal conductivity (W/(m · K)) | 0.066 | 0.050 | 0.068 | 0.058 | 0.049 |

All the samples tested according to the invention have a thermal conductivity below 0.07 $W \cdot m^{-1} K^{-1}$.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding French Application No. 13/62984, filed Dec. 19, 2013 are incorporated by reference herein.

The invention claimed is:

1. A coating composition comprising:
   from 4 to 17 wt % of hollow microspheres having a thermal conductivity (designated lambda) below 0.1 $W \cdot m^{-1} \cdot K^{-1}$,
   from 0.05 to 1 wt % of at least one linear alcohol whose hydrocarbon chain comprises at least 8 carbon atoms,
   from 5 to 25 wt % of at least one bonding agent that is a water-dispersible or water-soluble polymer having a glass transition temperature (Tg) less than or equal to 65° C.,
   from 25 to 50 wt % of a non-hydraulic binder that is a mineral or metallic filler which is a carbonate of an alkaline-earth metal, alumina, silica, a silicate of aluminium, a silicate of an alkali metal, a silicate of an alkaline-earth metal, or a mixture thereof, said fillers having an average particle size of 5 to 100 µm,
   from 0.1 to 1 wt % of at least one thickener, and
   water,
   the percentages by weight being expressed in wt % of dry matter relative to the total weight of the coating composition.

2. The coating composition according to claim 1, wherein the hollow microspheres have a real density of 0.05 to 0.5 g/cm³.

3. The coating composition according to claim 1, wherein the hollow microspheres are hollow microspheres having an average particle size (D50) of 0.10 to 100 µm.

4. The coating composition according to claim 1, wherein the hollow microspheres are hollow glass or polymer microspheres of sodium or calcium borosilicate, of aluminosilicate, or of vinylidene chloride/acrylonitrile.

5. The coating composition according to claim 1, wherein the alcohol is a mixture of linear fatty alcohol(s) of formula ROH, where R is a linear hydrocarbon chain, saturated or unsaturated, having from 8 to 30 carbon atoms and of vinyl polyol(s), having a Tg of 75 to 95° C.

6. The coating composition according to claim 1, wherein the water-dispersible or water-soluble polymer is a copolymer of styrene and (meth)acrylic acid, a copolymer of styrene and ester of (meth)acrylic acid, a copolymer of styrene and (meth)acrylamide, said copolymers optionally being silanized, a homopolymer or copolymer of butadiene, a vinyl polymer a polyurethane, or a mixture thereof.

7. The coating composition according to claim 1, wherein the mineral filler is calcium carbonate or silica.

8. The coating composition according to claim 1, wherein the thickener is clay, a polysaccharide thickener or mixture thereof, optionally in the presence of soda.

9. A method of applying a composition as defined in claim 1, comprising at least the following:
   (i) applying said composition in one or more successive layers on a surface of a substrate using a roller and/or a smoothing tool, then
   (ii) drying said layer, then
   (iii) optionally applying, on said hardened coating layer a layer of a non-insulating material.

10. The method according to claim 9, comprising at least the following:
    (i') applying a first layer of a composition on a surface of a substrate using a roller, then
    (ii') applying of a second layer of a composition on said first layer deposited using a smoothing tool, the time that passes between the first and second application of the composition being less than 30 minutes, or
    (ii") smoothing of the surface using a smoothing tool without adding additional material, then
    (iii') drying the coating composition, then
    (iv') optionally applying, on said hardened coating layer, a layer of a non-insulating material.

11. The method according to claim 9, comprising at least the following:
    (i''') applying a layer of a composition on a surface of a substrate, using a smoothing tool, then
    (ii''') drying the coating composition, then
    (iii''') optionally applying, on said hardened coating layer, of a layer of a non-insulating material.

12. The method according to claim 9, wherein the roller used in (i) is a honeycomb textured foam roller.

13. A substrate covered with a hardened layer of coating composition of thickness in the range from 0.5 to 3 millimeters obtainable by the method as defined in claim 9.

14. A process for smoothing and/or heat-insulating interior walls and ceilings, comprising achieving heat insulation or smoothing on said wall or ceiling by applying a composition according to claim 1.

15. The coating composition according to claim 6, wherein the copolymer of butadiene is polybutadiene or polybutadiene styrene and the vinyl polymer is polyvinyl chloride or polyvinyl acetate.

16. The method according to claim 10, wherein the roller used in (i') is a honeycomb textured foam roller.

17. A substrate covered with a hardened layer of coating composition of thickness in the range from 0.5 to 3 millimeters obtained by the method as defined in claim 9.

18. An interior wall or ceiling coated with a composition according to claim 1.

* * * * *